United States Patent
Lindley et al.

(10) Patent No.: US 9,992,147 B2
(45) Date of Patent: Jun. 5, 2018

(54) DURING AN EMAIL MIGRATION, CONVERTING DISTRIBUTION LIST MESSAGES INTO SINGLE-INSTANCED CONTENT WITHIN A COLLABORATION PLATFORM GROUP

(71) Applicant: Quest Software Inc., Aliso Viejo, CA (US)

(72) Inventors: Chad Lindley, Mt. Horeb, WI (US); Jon Obst, Madison, WI (US)

(73) Assignee: Quest Software Inc., Aliso Viejo, CA (US)

( * ) Notice: Subject to any disclaimer, the term of this patent is extended or adjusted under 35 U.S.C. 154(b) by 276 days.

(21) Appl. No.: 14/835,530

(22) Filed: Aug. 25, 2015

(65) Prior Publication Data
US 2017/0063764 A1    Mar. 2, 2017

(51) Int. Cl.
| G06F 15/16 | (2006.01) |
| H04L 12/58 | (2006.01) |
| H04L 29/08 | (2006.01) |
| G06F 17/30 | (2006.01) |
| G06Q 10/10 | (2012.01) |

(52) U.S. Cl.
CPC ............ *H04L 51/22* (2013.01); *G06F 17/303* (2013.01); *G06Q 10/10* (2013.01); *H04L 51/04* (2013.01); *H04L 51/16* (2013.01); *H04L 67/10* (2013.01)

(58) Field of Classification Search
CPC ......... H04L 51/22; H04L 51/04; H04L 51/16; H04L 67/10; G06F 17/303; G06Q 10/10
USPC .......................................................... 709/206
See application file for complete search history.

(56) References Cited

U.S. PATENT DOCUMENTS

| 2005/0015443 | A1* | 1/2005 | Levine .................. H04L 51/066 709/204 |
| 2007/0011257 | A1* | 1/2007 | Jeong .................... G06Q 10/107 709/206 |
| 2010/0312836 | A1* | 12/2010 | Serr ........................ G06Q 10/00 709/206 |
| 2015/0350143 | A1* | 12/2015 | Yang ..................... G06F 3/0482 345/173 |
| 2016/0099998 | A1* | 4/2016 | Richman ............. H04L 67/1095 709/202 |

\* cited by examiner

*Primary Examiner* — Joseph L Greene
(74) *Attorney, Agent, or Firm* — Kirton McConkie; Brian Tucker

(57) ABSTRACT

During an email migration, a migration engine can identify which emails in the source system are associated with distribution lists. The migration engine can convert any emails that are associated with a distribution list into group content of an appropriate group in the target system. In contrast, for any email that is not associated with a distribution list, the migration engine can migrate the email into a corresponding mailbox in the target system.

20 Claims, 13 Drawing Sheets

DURING AN EMAIL MIGRATION, CONVERTING DISTRIBUTION LIST MESSAGES INTO SINGLE-INSTANCED CONTENT WITHIN A COLLABORATION PLATFORM GROUP

CROSS-REFERENCE TO RELATED APPLICATIONS

N/A

BACKGROUND

A distribution list is a grouping of contacts that is often employed in an email or other collaboration system to facilitate sending an email to a number of recipients. For example, a user could create a distribution list named "Friends" that groups together the email addresses of a number of the user's friends. Then, when the user wants to send an email to each of the friends, the user can simply specify the Friends distribution list in the To: field of the email and a separate copy of the email will be sent to each friend.

Recently, a number of collaboration platforms have been created to facilitate group interactions. These collaboration platforms typically provide a group communication interface that functions similar to an email mailbox (hereinafter "mailbox") except that each member of the group has shared access to the group's content. For example, Microsoft's Office 365 includes a feature known as Office 365 Groups ("O365 Groups"). An O365 Group is a logical grouping of a number of users which allows each user of the group to have shared access to content, including communications, of the group. These groups, therefore, function similar to distribution lists in that they facilitate group communication.

FIG. 1 illustrates a user interface 100 that generally illustrates how O365 Groups and other similar collaboration tools are structured. In this example, it is assumed that user interface 100 is displayed to a user, User_123, who is a member of a number of groups including Group A, Group B, and Group C. The left-hand side of user interface 100 comprises a navigation pane 101 that includes a typical email folders section 101a and a groups section 101b. As indicated by the underline, User_123 has selected Group A from within groups section 101b. As a result, user interface 100 also displays a selected group section 102 which lists a number of conversations that have been created within Group A. As shown, each conversation includes a title (which is similar to the title of an email originally sent to a distribution list), an indication of the user that created the conversation (which is similar to the sender of the original email), and a summary of the content of the conversation (which is similar to the body of the original email and the body of any email sent in response to the original email). Although not shown, each conversation may also include an indicator of the users (or at least the number of users) that have participated in the conversation (which, in terms of distribution lists, would represent which users have responded to the original email).

As indicated by the shading, User_123 has selected Conversation A within selected group section 102. As a result, user interface 100 is displaying the communications of Conversation A within a contents section 103. As shown, the title 103a of Conversation A (which is defined as part of creating the first communication 103a1 in the conversation) is shown at the top of contents section 103. Then, each individual communication 103a1-103a3 within conversation 103a is listed. Each communication identifies who created the communication and then lists the contents of the communication.

Although not shown in FIG. 1, a group can provide access to shared documents. Such documents could be attached to individual group communications (similar to an email attachment) or may be associated generally with a conversation or a group (e.g., via a direct upload). Similarly, a group may include a shared calendar and other features that are often provided within a typical email interface. A key benefit of groups is that the content of the group, including all communications sent within the group, is single-instanced and persistent. In other words, a communication from a member of the group to the group can be viewed as a single email being stored in a shared location. In contrast, with a distribution list, a separate copy of the email would be created and sent to each member of the distribution list.

FIG. 2 provides a simplified representation of the data structures that can be used to define a group which in this case is Group A. As shown, Group A is defined by the members data structure 201 which lists each member that belongs to the group. Group A is also defined by a number of conversation data structures 202a, 202b which define the content of the communications in the conversation as well as the sender of such communications. The actual content would be stored centrally to enable shared access by any member of the group. This example is intended only to illustrate how a group employs single-instanced content and is not intended to represent the specific structure employed by any particular implementation of a collaboration platform including Office 365.

The fact that group content is single-instanced content provides various benefits. For example, if a user is added to a group, the user would receive access to all previous conversations and content within the group since this data is centrally stored. In contrast, if a user is added to a distribution list, that user will not have access to any previous communications that were sent to the distribution list because the user would not have been a recipient of any of the previous communications.

Although it is possible to map a distribution list to a group, doing so does not provide group access to communications previously sent to the distribution list. Such a mapping would only create a new group that includes the members of the old distribution list. However, any communications that had been sent using the distribution list would not be available within the new group. Therefore, the group could be used for future communications, but all previous communications within the distribution list would only be accessible within the traditional mailbox of each member of the distribution list.

BRIEF SUMMARY

The present invention extends to methods, systems, and computer program products for converting distribution list messages into single-instanced content within a collaboration platform group during an email migration. In other words, the present invention can be employed to convert existing distribution list emails into group content.

A migration engine, which is used to migrate email and possibly other content from a source system to a target system, can be configured to discover and classify which objects in the source system are distribution lists, users, contacts, resources, etc. Then, during the migration process, the migration engine can identify which emails in the source system are associated with distribution lists. The migration engine can then convert the emails into group content of an appropriate group in the target system. In a particular example, the present invention can be used to convert emails associated with a distribution list into group content within an O365 group.

In one embodiment, the present invention is implemented as a method for processing an email during a migration from a source system to a target system. A migration engine accesses a first email that is stored in a first mailbox of a first user specified for migration from the source system. The migration engine processes the first email to determine whether the first email is associated with a distribution list such that when the migration engine determines that the first email is associated with a first distribution list, the migration engine converts the first email into group content within a first group in the target system, whereas when the migration engine determines that the first email is not associated with a distribution list, the migration engine migrates the first email into a first mailbox of the first user within the target system.

In another embodiment, the present invention is implemented as a method for migrating email from a source system to a target system. The migration engine accesses the source system to identify a number of objects defined within the source system. The objects include a number of users having a mailbox in the source system and one or more distribution lists. For each user, the migration engine creates a mailbox in the target system. For each distribution list, the migration engine creates a group in the target system. For at least one of the mailboxes in the source system, the migration engine processes at least one email in the mailbox by performing the following: determining whether the email is associated with one of the one or more distribution lists; when the email is associated with one of the one or more distribution lists, converting the email into group content within the corresponding group in the target system; and when the email is not associated with one of the one or more distribution lists, migrating the email to the corresponding mailbox in the target system.

In another embodiment, the present invention is implemented as a migration engine that migrates email from a source system to a target system. The migration engine accesses the source system to identify a number of users and a number of distribution lists that are defined with the source system. The migration engine creates, within the target system, a group for each distribution list and a mailbox for each user defined within the source system. The migration engine accesses, in the source system, a first mailbox for a first user. The migration engine processes each of a plurality of emails in the first mailbox by: determining whether the email is associated with one of the distribution lists; when the email is determined to be associated with one of the distribution lists, creating or identifying a conversation within a corresponding group in the target system and creating a conversation based on the email within the created or identified conversation; and when the email is determined to not be associated with one of the distribution lists, migrating the email into a mailbox for the first user on the target system.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

In order to describe the manner in which the above-recited advantages and features and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

In this specification, a group should be construed as a logical construct of a collaboration platform which provides a number of members of the group with shared access to single-instanced group content. As described above, one example of a group is an O365 group. Single-instanced content should be construed as content that is centrally stored and shared among members of a group to which the content pertains. A single-instanced email (or communication) can therefore be construed as a single copy of the email that can be accessed by each member of the group. This is in contrast to a distribution list where each member would receive his or her own copy of the email.

Figure 1:
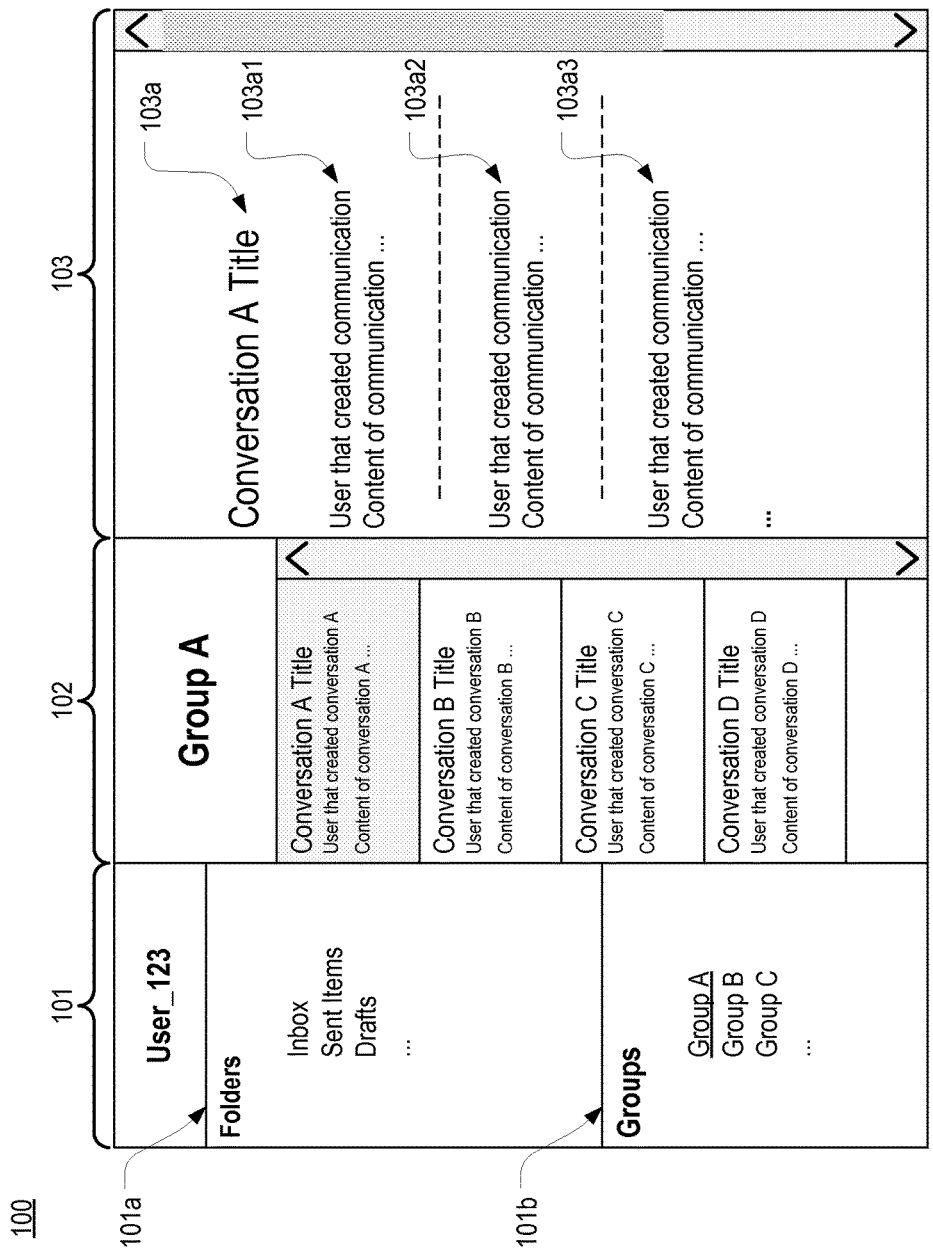
FIG. 1 illustrates a user interface of an exemplary collaboration tool that provides group collaboration functionality.
Figure 2:
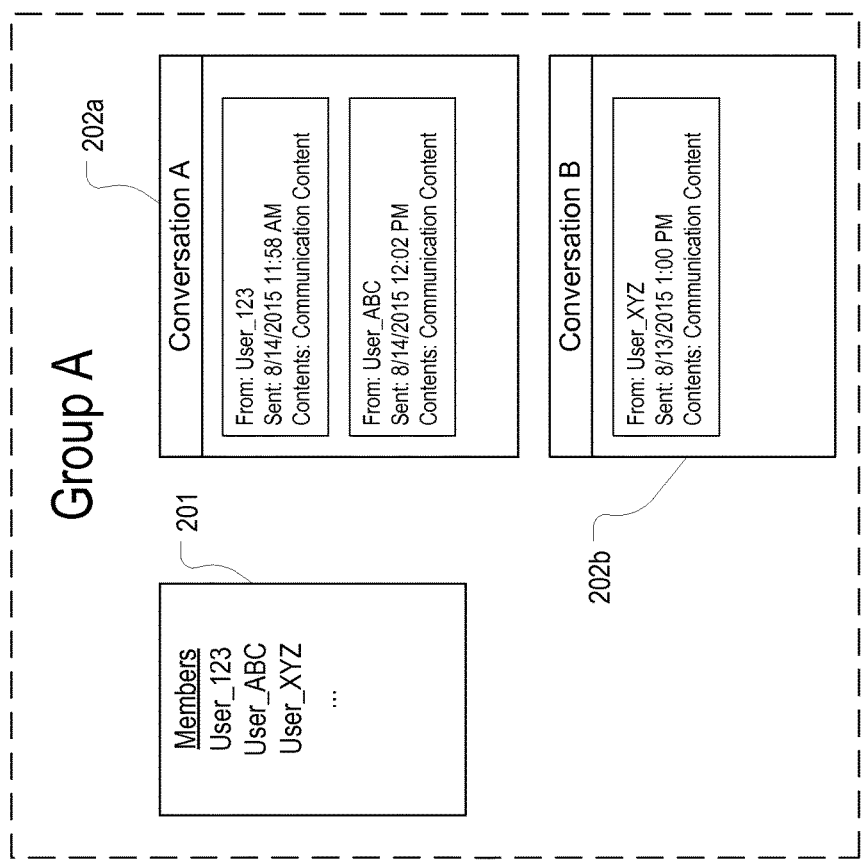
FIG. 2 illustrates an example data structure that can be employed for storing group content within a collaboration tool.
Figure 3:
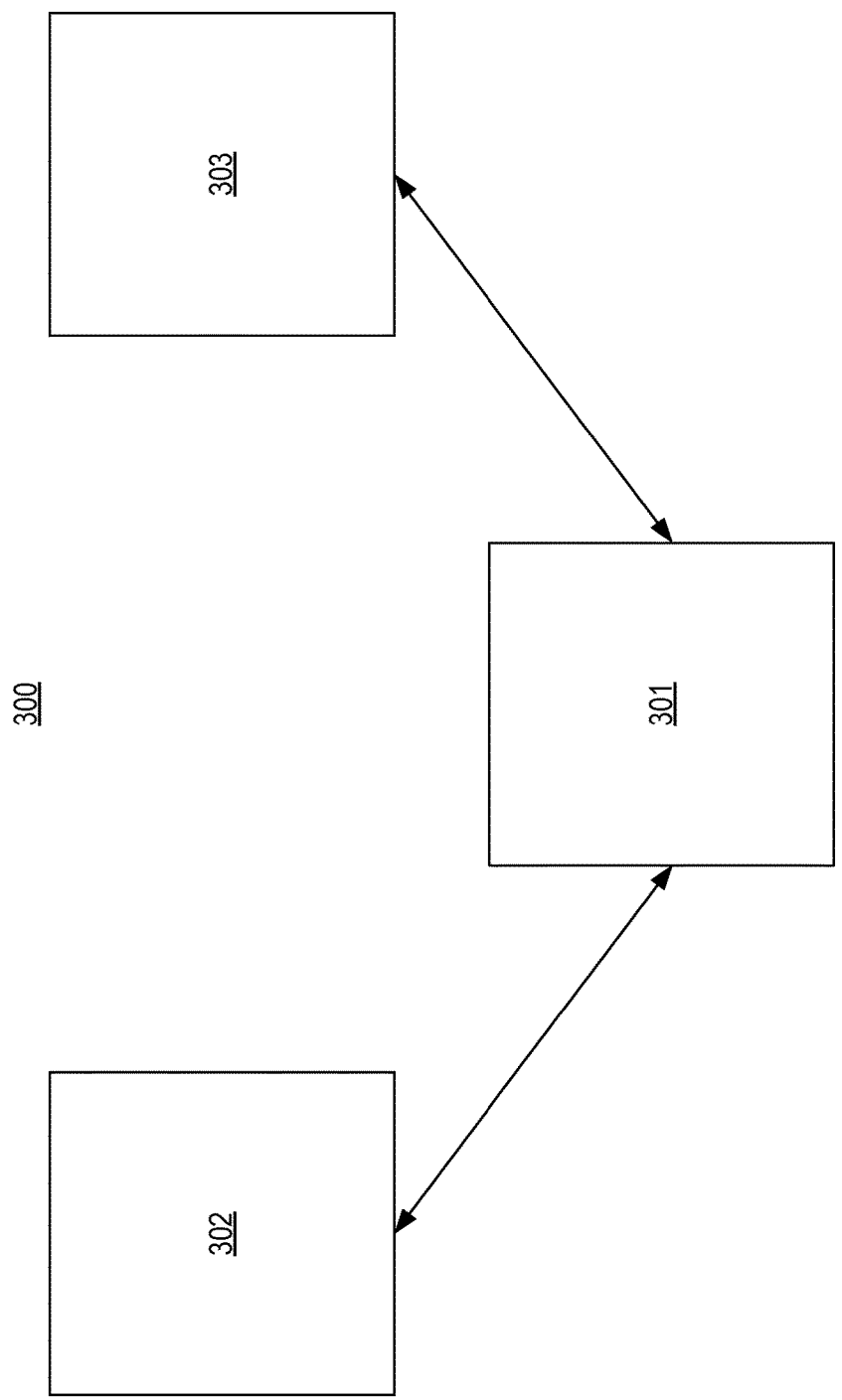
FIG. 3 illustrates an example environment in which a migration engine can perform a migration from a source system to a target system.

FIG. 3 illustrates an example of an environment 300 in which the present invention can be implemented. Environment 300 includes a migration engine 301 that functions as an intermediary between a source system 302 and a target system 303 during an email migration. Migration engine 301 can be configured, as is known in the art, to migrate emails and other content from source system 302 to target system 303. For example, migration engine 301 can employ the Messaging Application Program Interface (MAPI) protocol, the Exchange Web Services (EWS) protocol, or another suitable protocol for migrating emails from source system 302 to target system 303.

Source system 302 can represent any type of system that employs distribution lists. In a typical scenario, source system 302 can represent a mail server such as a Microsoft Exchange Server. However, source system 302 may also represent a system that implements another type of collaboration platform that includes distribution list functionality. Target system 303 can represent any type of system that employs groups. For example, target system 303 can represent an Office 365 implementation. Accordingly, in a typical scenario, the present invention may be employed to migrate a company's existing email server to an Office 365 implementation. Any type of networking connection may be employed to interconnect migration engine 301 with source system 302 and target system 303.

Although the specification will primarily refer to emails associated with distribution lists being converted into group content, such references to emails should be construed as including other types of communications that are associated with distribution lists. Therefore, the term "email" should be construed broadly to encompass any type of communication whose recipients are defined using a distribution list.

Prior to performing a migration, migration engine 301 can be configured to identify a number of objects that exist within source system 302. These objects may include users, contacts, distribution lists, and resources among other things. For example, in a Microsoft Exchange Server implementation, source system 302 would typically employ Active Directory to store an object for each user, distribution list, contact, etc. In such cases, migration engine 301 could identify such objects within source system 302's Active Directory. Of course, in source systems that employ other platforms, the users, contacts, distribution lists, etc. would be identified in other manners as is known in the art. In any case, as an initial step of the migration process, migration engine 301 can identify which users exist within the source system as well as any distribution lists that have been created by such users. Then, once migration engine 301 has identified the users and distribution lists that exist within source system 302, migration engine 301 can commence the migration process.

Figure 4A:
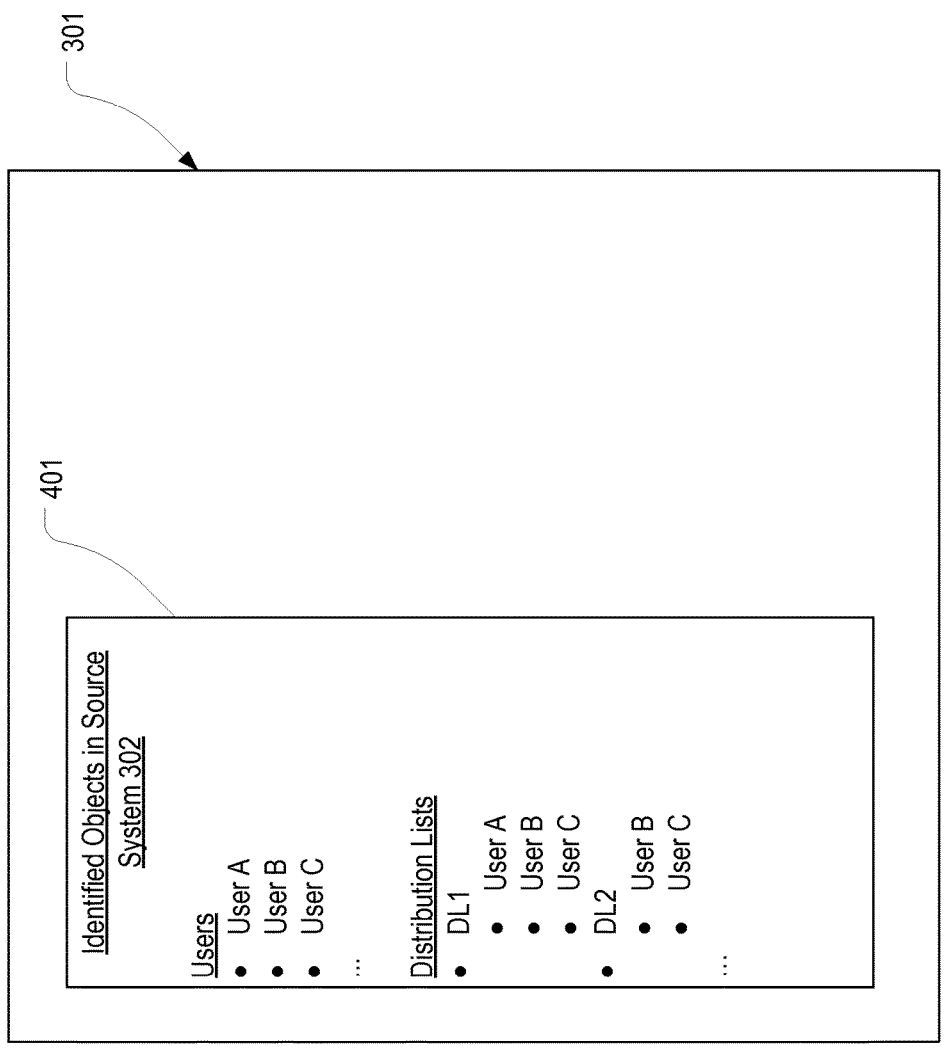
FIG. 4A illustrates an example data structure that can be generated by a migration engine to identify objects that are defined within the source system.

FIGS. 4A-4D provide an example of how the migration process can be performed. For purposes of this example and as shown in FIG. 4A, it will be assumed that migration engine 301 discovered a number of users including User A, User B, and User C, and a number of distribution lists including DL1 and DL2 that were defined on source system 302. This information will be referred to herein as identified objects 401. Migration engine 301 can then employ identified objects 401 during the migration process to determine whether any email or other communication was sent to a distribution list, and, if so, convert the email or other communication into group content within target system 303. In contrast, any email or other communication that is determined to not be associated with a distribution list can be migrated directly to the corresponding user's mailbox on target system 303 as is known in the art.

Figure 4B:
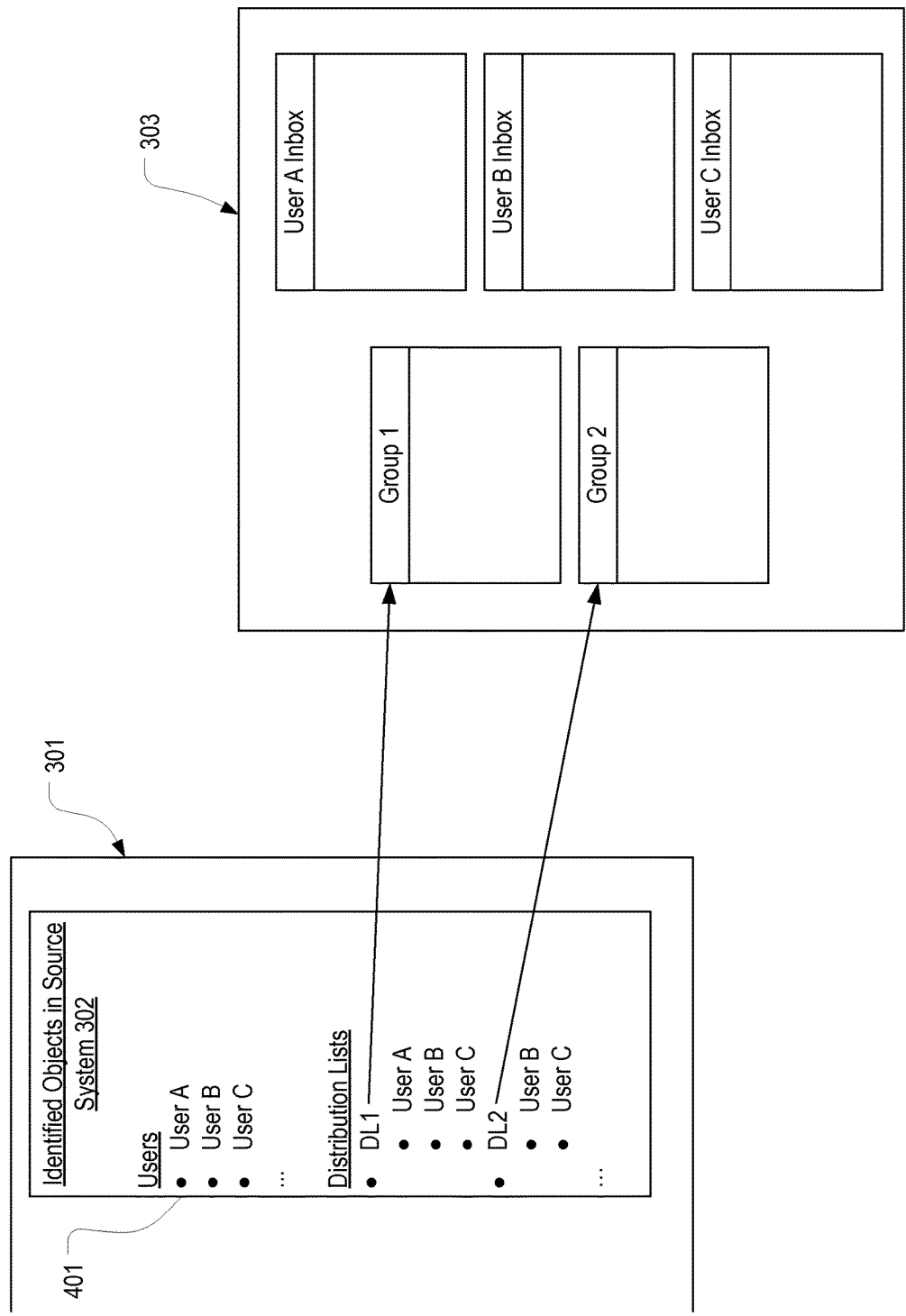
FIG. 4B illustrates how the migration engine can create groups and mailboxes within the target system based on the identified objects within the source system.

Based on identified objects 401, migration engine 301 can create corresponding data structures within target system 303. As shown in FIG. 4B, this includes creating a mailbox for each user (including User A, User B, and User C) identified within source system 302. Additionally, migration engine 301 can create a group for each distribution list (including DL1 and DL2) identified in source system 302. As indicated by the arrows, a first group, Group 1, is created for DL1 and a second group, Group 2, is created for DL2 within target system 303. The creation of these groups can include defining a name for the group (which may be based on the name of the distribution list or otherwise defined based on user input during the configuration process) and adding each member of the distribution list to the group.

Once the appropriate mailboxes and groups have been created in target system 303, migration engine can then begin migrating the content from source system 302 to target system 303. In accordance with embodiments of the present invention, migration engine 301 can determine whether a particular communication found within a mailbox in source system 302 should be migrated to a corresponding mailbox in target system 303 or instead should be mapped into corresponding group content within a group in target system 303. In other words, migration engine 301 can employ identified objects 401 to determine whether a particular communication is associated with a distribution list, and, if so, map the communication to a group rather than migrating it to the corresponding mailbox.

Figure 4C:
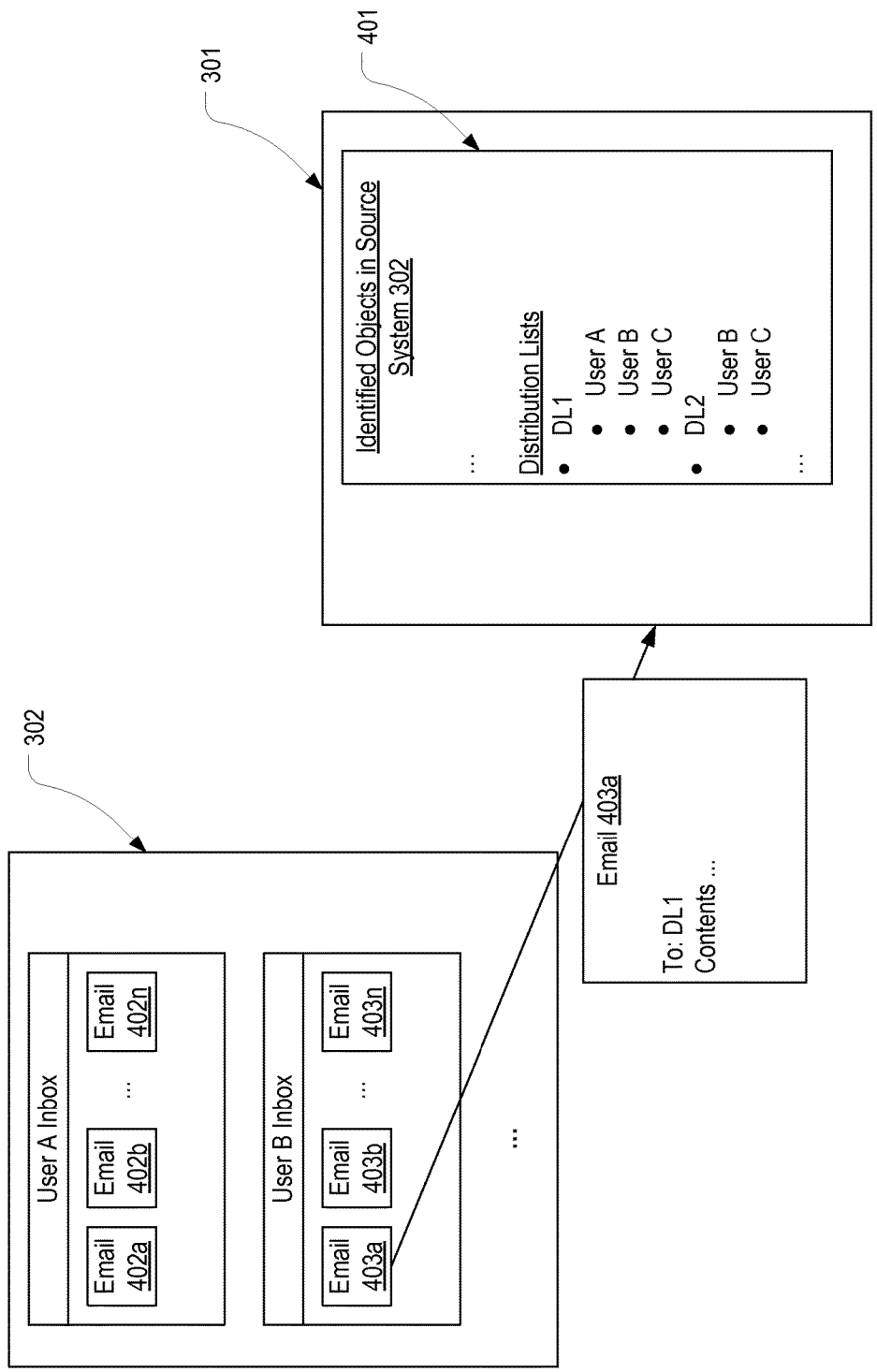
FIG. 4C illustrates how the identified objects data structure can be employed to determine whether an email is associated with a distribution list.

FIG. 4C illustrates how migration engine 301 can make this determination. As indicated by the arrow, migration engine 301 has accessed email 403a within User B's mailbox. As shown, email 403a was sent to DL1@company.com (which is assumed to be the email address defined for DL1). Because DL1 includes User A, User B, and User C, a copy of email 403a was sent to each of these users (i.e., to user_a@company.com, user_b@company.com, and user_c@company.com). Migration engine 301 can access the contents of one or more headers of email 403a and compare such contents to the distribution lists defined within identified objects 401. Although not shown, identified objects 401 can store additional information about each distribution list including an email address defined for the distribution list (which in this example would be DL1@company.com). In this case, the contents of the To: field (which is assumed to be based on the email's To header) match DL1. Migration engine 301 can therefore determine that email 403a is associated with DL1.

In FIG. 4C, it is assumed that the email address of the distribution list is displayed in the To: field of the email. However, it is noted that this is not always the case with all email programs. For example, in the Simple Mail Transfer Protocol ("SMTP") an "Envelope Recipient" header is employed to define the recipients of the email. When a distribution list is used by the sender, this header would include the email address of the distribution list. The contents of this header, however, are not displayed within the email To: field. A separate header, the To: header, is employed to define what will be displayed. In some cases, these two headers will contain the same content (i.e., they may both include the distribution list email address such as DL1@company.com). However, in other cases, the server may place the email addresses of each member of the distribution list in the To: header so that these email addresses will be displayed to the recipients. For this reason, when SMTP is employed by the source system, the present invention may be configured to inspect the contents of the "Envelope Recipient" header and compare such contents to identified objects 401 to determine whether the email is associated with a distribution list. For purposes of illustration, FIG. 4C as well as FIGS. 5B-5E show a comparison between the displayed To: field of the email and identified objects 401. Although this is one possible way to perform the comparison, the typical comparison would be performed as described above using the "Envelope Recipient" header.

It is noted that it is also possible to determine that an email is associated with a distribution list by comparing the email addresses of each recipient of the email to the users of the distribution list. For example, the To: field or any header of email 403*a* could list user_a@company.com, user_b@company.com, and user_c@company.com. Migration engine 301 could be configured to compare such identified recipients to the users defined for DL1 and, since they match, conclude that the email is associated with the distribution list.

Figure 4D:
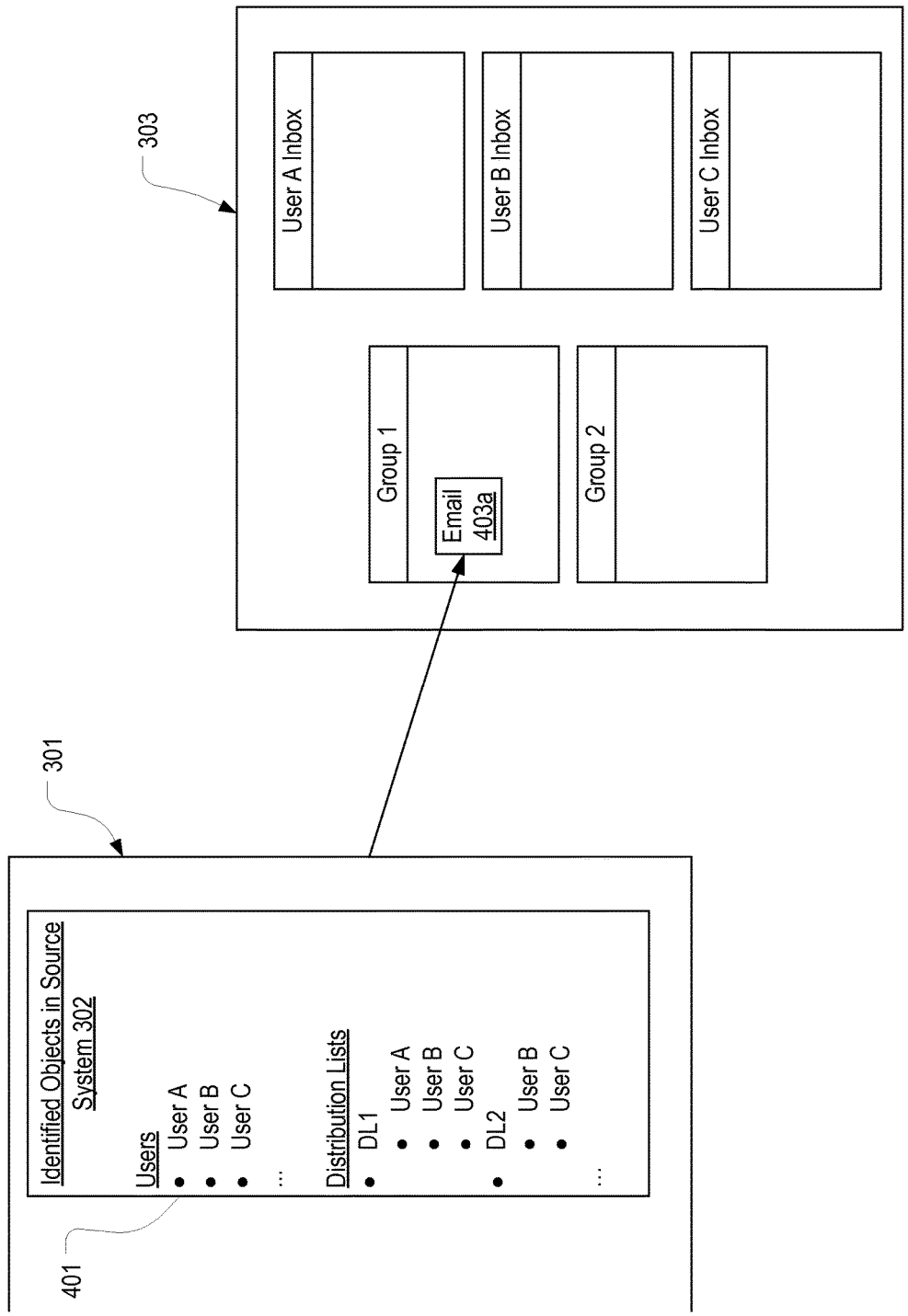
FIG. 4D illustrates how an email that is associated with a distribution list can be converted into group content within a group in the target system.

Because email 403*a* is identified as being associated with DL1, migration engine 301 can map the content of email 403*a* to Group 1 rather than migrating the email directly into User B's mailbox on target system 303. For simplicity, FIG. 4D illustrates that email 403*a* is simply stored within Group 1. The particular manner in which the content of email 403*a* can be added to Group 1 will depend on the particular implementation of collaboration software used on target system 303. An example of this process will be described below with reference to FIGS. 5A-5F.

As can be seen, after the processing of email 403*a*, User B's mailbox on target system 303 does not include a copy of email 403*a* even though User B's mailbox on source system 302 did. Because email 403*a* was sent to DL1, User A and User C also received copies of the email. Therefore, when each of User A's and User C's mailboxes are migrated, the corresponding copy of the email (assuming it is still present in the mailboxes) would likewise not be migrated to their mailboxes on target system 303. In this way, after migration, email 403*a* becomes a single-instanced email stored centrally within Group 1. As will be further described below with reference to FIG. 5E, migration engine 301 can employ a technique for ensuring that copies of the same email are not duplicated within the group.

In some embodiments, when an email contained within a user's mailbox on source system 302 is mapped to a group on target system 303, a placeholder message can be added to the user's mailbox on the target system. This placeholder message, while not including the content of the original email, can include a link to the corresponding content that was added to the group. This can allow the user to quickly navigate from the user's mailbox on target system 303 to the group content.

FIGS. 5A-5F illustrate an example of how migration engine 301 can process a number of emails associated with a distribution list in accordance with embodiments of the present invention. In this example, it will be assumed that migration engine 301 has performed initial processing on source system 302 to generate identified objects 401 and that appropriate mailboxes and groups have been created on target system 303.

Figure 5A:
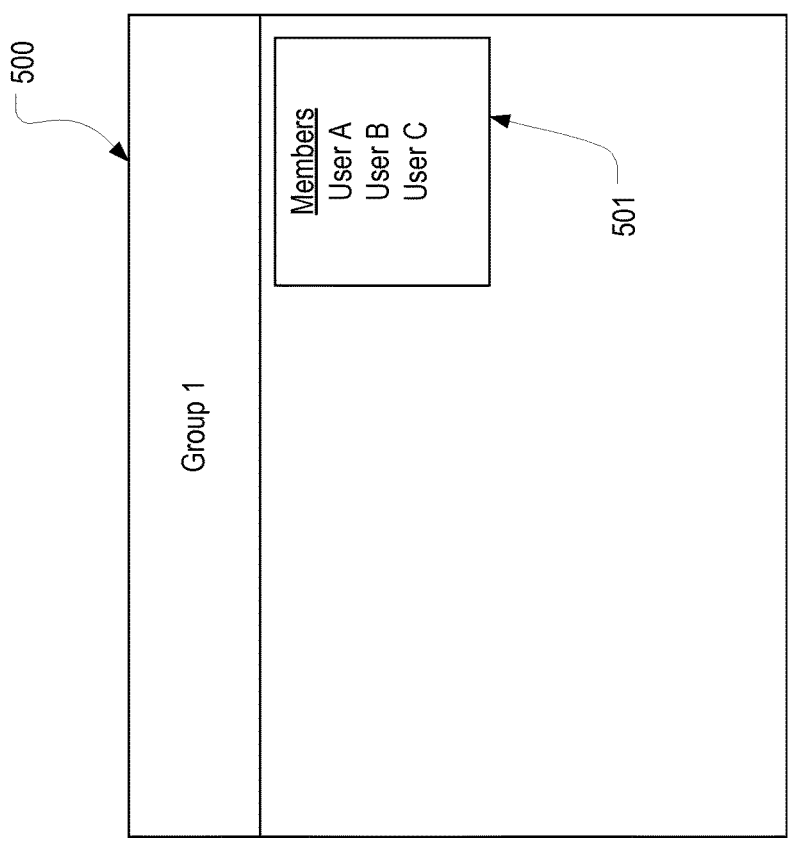
FIG. 5A illustrates how the migration engine can create a group in the target system based on a distribution list that is defined in the source system.

FIG. 5A provides a representation 500 of Group 1 that can represent the state of Group 1 as it may exist on target system 303 prior to migration engine 301 migrating any communications from source system 302 to target system 303. As shown, migration engine 301 has created the structure of Group 1 based on the definition of D1 within identified objects 401. The creation of this structure includes creating a members data structure 501 that defines which members belong to Group 1 which in this case are User A, User B, and User C. At this point, because no emails have been migrated (or at least because no emails determined to be associated with DL1 have been migrated), Group 1 does not include any conversations.

Figure 5B:
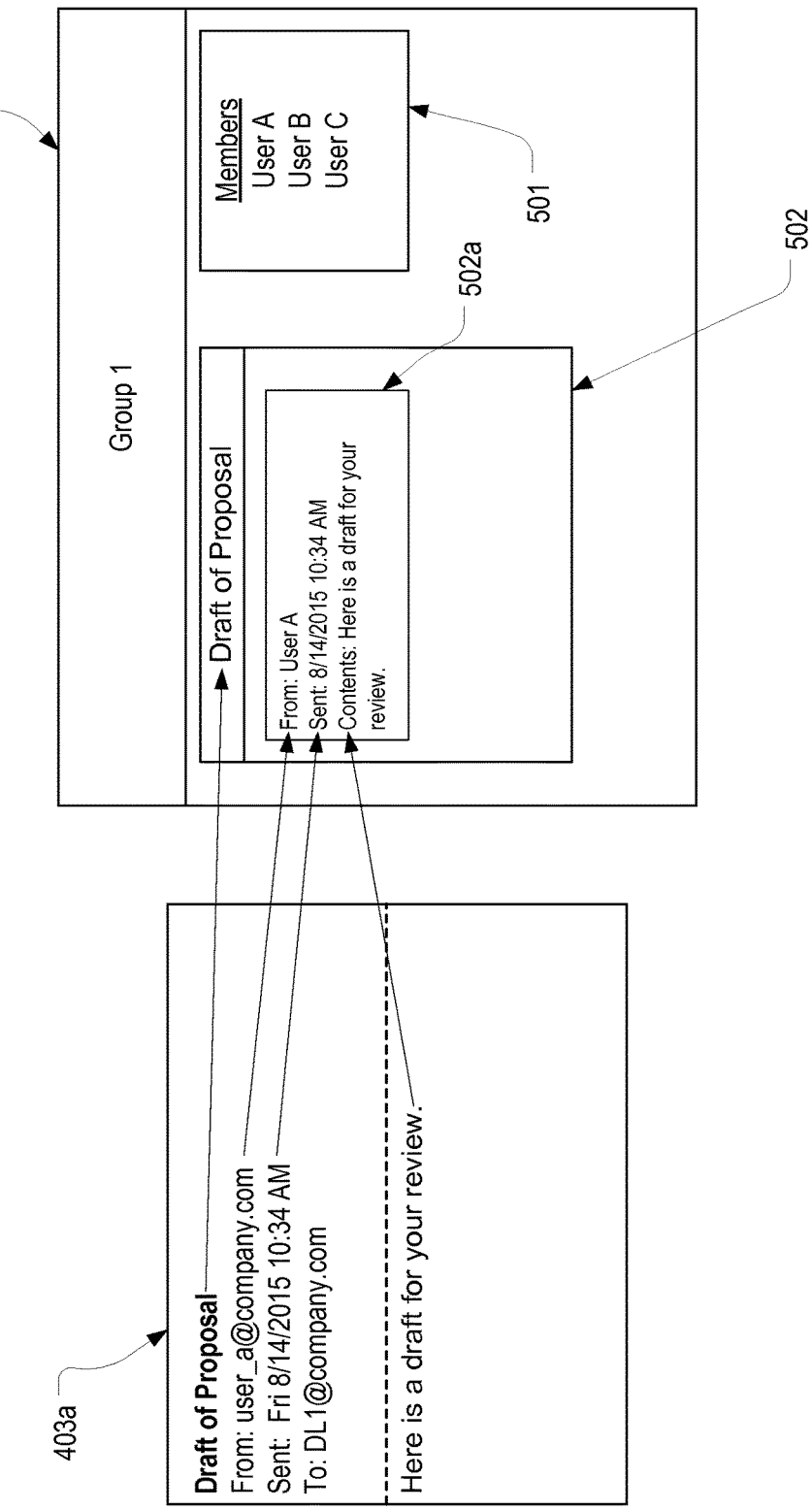
FIG. 5B illustrates how the migration engine can create a conversation and a first communication within the conversation based on an email stored in the source system that was determined to be associated with a distribution list.
Figure 5C:
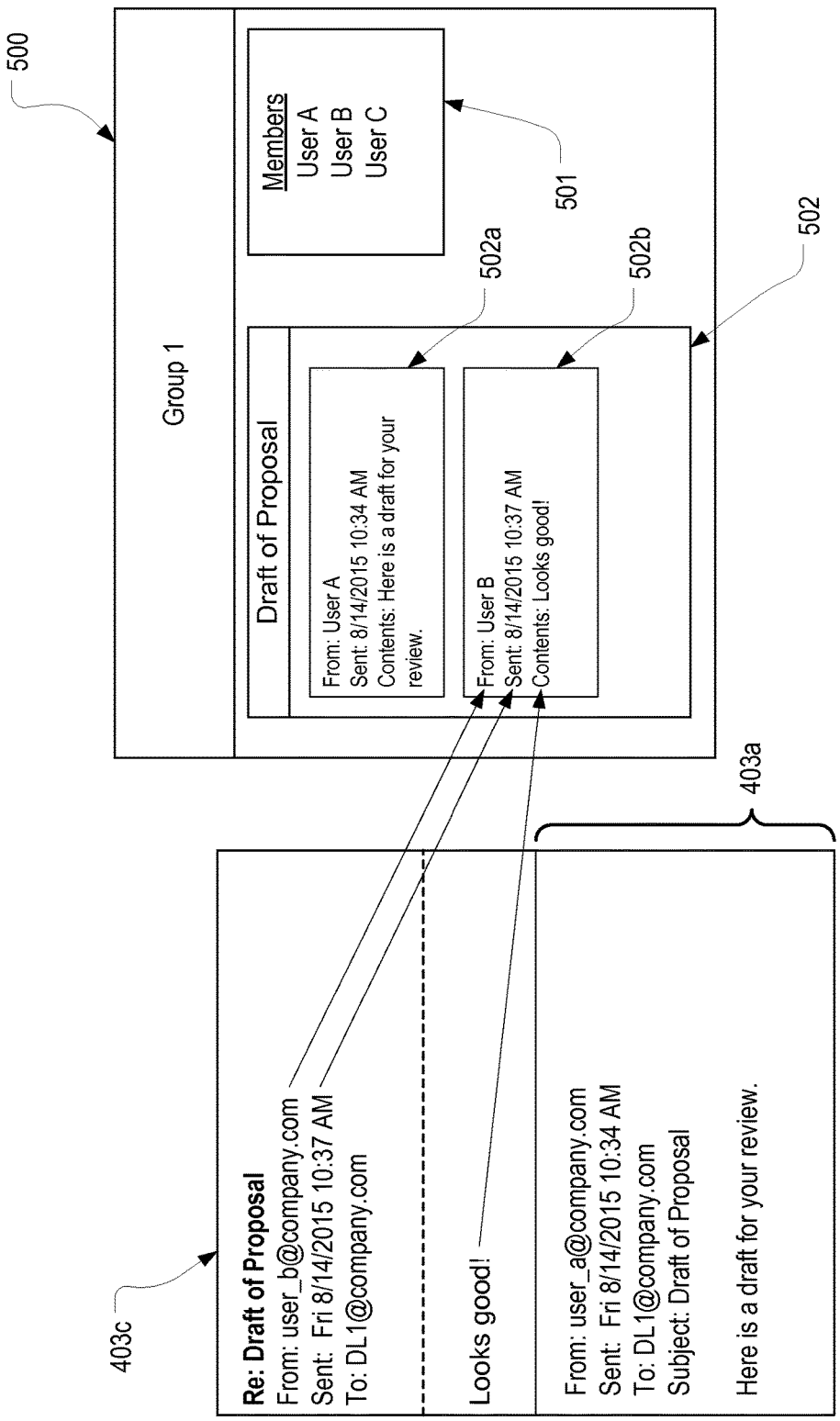
FIG. 5C illustrates how the migration engine can create a second communication within the conversation based on another email stored in the source system that was determined to be associated with the distribution list.
Figure 5D:
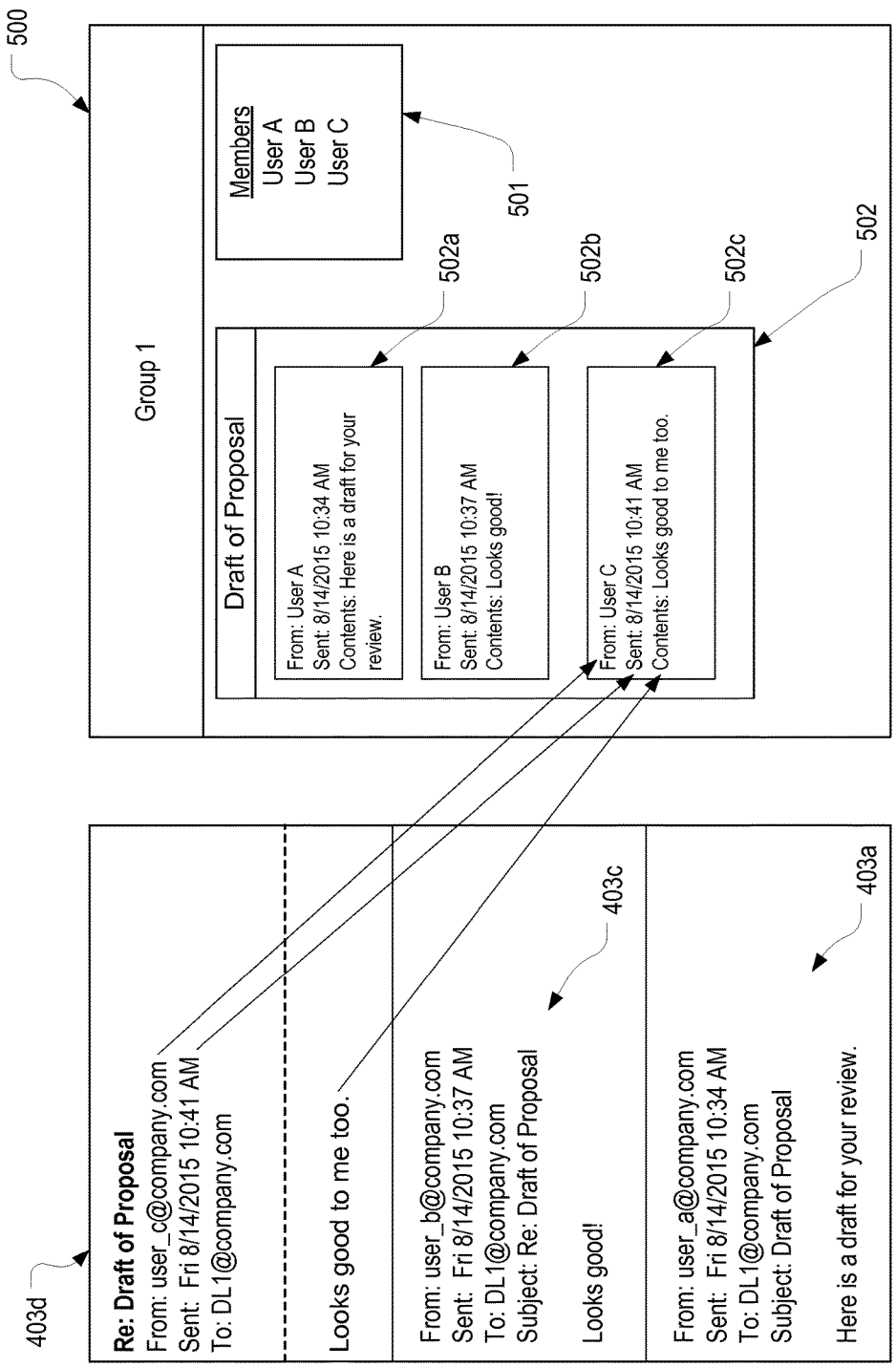
FIG. 5D illustrates how the migration engine can create a third communication within the conversation based on another email stored in the source system that was determined to be associated with the distribution list.

FIGS. 5B-5D represent various steps that migration engine 301 can perform while migrating User B's mailbox from source system 302 to target system 303. In FIG. 5B, migration engine 301 is processing an email 403*a*. Initially, and as described above, migration engine 301 can determine whether email 403*a* is associated with a distribution list. This determination can be based at least primarily on an identification of the distribution list within the email (e.g., the presence of the distribution list's email address within the "Envelope Recipient" header of the email). In this case, the To: field is shown as including DL1@company.com which is the email address for DLL Migrating engine 301 can therefore determine that email 403*a* is associated with DLL Because email 403*a* is determined to be associated with DL1, migration engine 301 converts the content of email 403*a* into the appropriate format for inclusion in Group 1. This may include creating a conversation data structure 502 within Group 1 (assuming one has not already been created for this conversation) and naming conversation data structure 502 with the subject of email 403*a*. In this case, email 403*a* has a subject of "Draft of Proposal." Accordingly, migration engine 301 creates a conversation named "Draft of Proposal" within Group 1. The conversion of email 403*a* into the appropriate format may also include creating a communication 502*a* within conversation data structure 502 to represent email 403*a*. As shown, migration engine 301 uses the contents of email 403*a*'s From field, which in this case is user_a@company.com, to populate the From field within communication 502*a*. Because migration engine 301 knows that user_a@company.com is User A's email address (e.g., based on information within identified objects 401), User A's name can be populated into the From field.

Migration engine 301 can also use the contents of email 403*a*'s Sent field and body to populate corresponding Sent and Contents fields within communication 502*a*. However, the contents of email 403*a*'s To: field is not propagated since there is no longer any need to preserve such information given that the Group inherently represents the recipients of all communications it contains.

As indicated above, since email 403*a* is converted into group content, it is not migrated into User B's mailbox on target system 303. In some embodiments, a placeholder may be created in User B's mailbox on target system 303 that includes a link to communication 502*a* or at least to conversation 502.

FIG. 5C represents similar steps that can be performed when migration engine 301 processes an email 403*c* within User B's mailbox which happens to be a reply to email 403*a*. As shown, email 403*c* was sent by User B in response to User A's original email 403*a*. During processing of email 403*c*, migration engine can initially determine whether email 403*c* is associated with a distribution list. As described above, this could be done based on the contents of the "Envelope Recipient" header (or possibly on the contents of the To: field or another similar field/header when a protocol other than SMTP is used). Because email 403*c* was sent to DL1@company.com, migration engine 301 can conclude that email 403*c* should be converted into group content within Group 1.

When processing email 403a as described above, no conversation existed in Group 1. However, while processing email 403c, migration engine 301 can identify that conversation data structure 502 has been created within Group 1 and compare email 403c to conversation data structure 502 and its contents (as well as to any other conversation data structures that may exist in Group 1). Such a comparison can be performed to determine a number of things including whether a new conversation should be created from email 403c, whether email 403c should be considered a communication of an existing conversation, and whether email 403c is a duplicate of a communication already created within an existing conversation.

In this case, migration engine 301 can identify that email 403c includes a subject that matches the name assigned to conversation data structure 502. For purposes of determining whether an email includes a matching subject, migration engine 301 can consider the presence of Re: or any other similar identifier within the subject. Since email 403c's subject matches the name of conversation data structure 502, migration engine 301 can determine that email 403c should likely be converted into a communication within the conversation. Similarly, migration engine 301 can examine the body of email 403c. Because the body of email 403c includes the contents of email 403a, migration engine 301 can determine that email 403c is a response to email 403a and therefore should be included as a communication within the conversation. Accordingly, FIG. 5C shows that migration engine 301 has created another communication 502b within conversation data structure 502 and mapped the From field, Sent field, and body of email 403c into corresponding fields within communication 502b.

Because migration engine 301 can determine that a portion of the body of email 403c is content of email 403a (e.g., by identifying that matching content already exists within communication 502a), this portion of email 403c can be excluded from the contents of communication 502b to eliminate redundant content. Accordingly, the contents of communication 502b only includes "Looks good!" which corresponds to the content that was added by User B within email 403c.

FIG. 5D illustrates that a similar process is performed when evaluating email 403d which happens to be User C's reply to email 403c. As described above, migration engine 301 can determine that email 403d is associated with DL1 and that email 403d should be considered a communication within the "Draft of Proposal" conversation (e.g., based on its subject and body that includes emails 403a and 403c). Accordingly, migration engine 301 creates communication 502c within conversation data structure 502.

Although not shown in this example, if during processing of any email on source system 302, migration engine 301 identifies that the email is associated with DL1 but is from a different thread than the "Draft of Proposal" thread, migration engine 301 can create a new conversation data structure for the thread in a similar manner as described above.

Figure 5E:
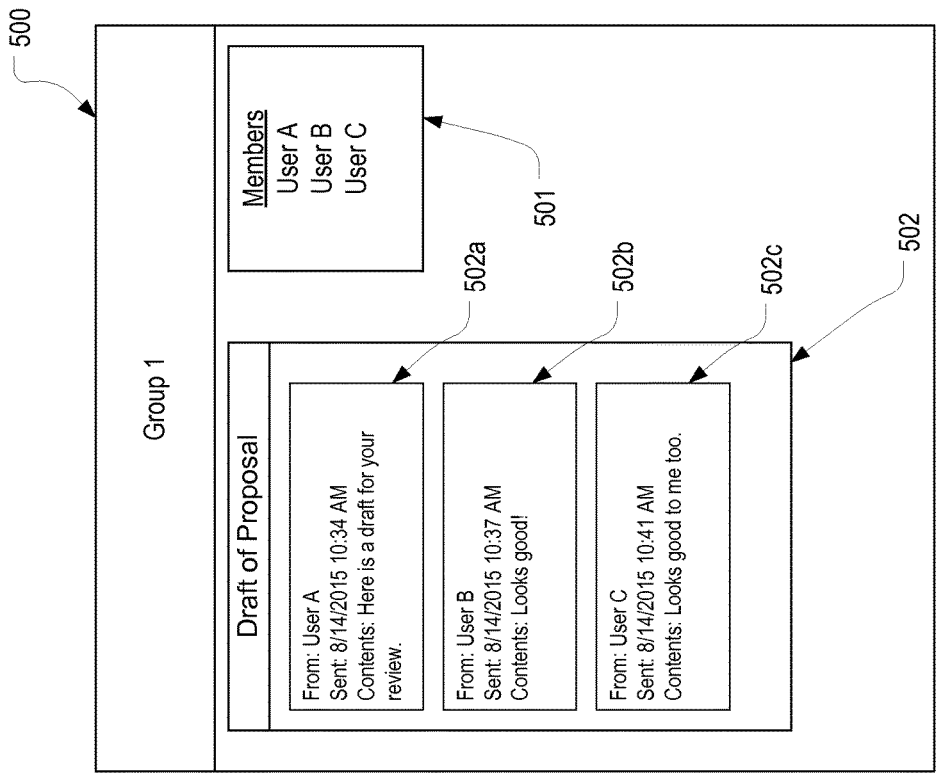
FIG. 5E illustrates how the migration engine can discard an email when it is determined that the email is a duplicate of another email for which a communication was already created.
Figure 5E:
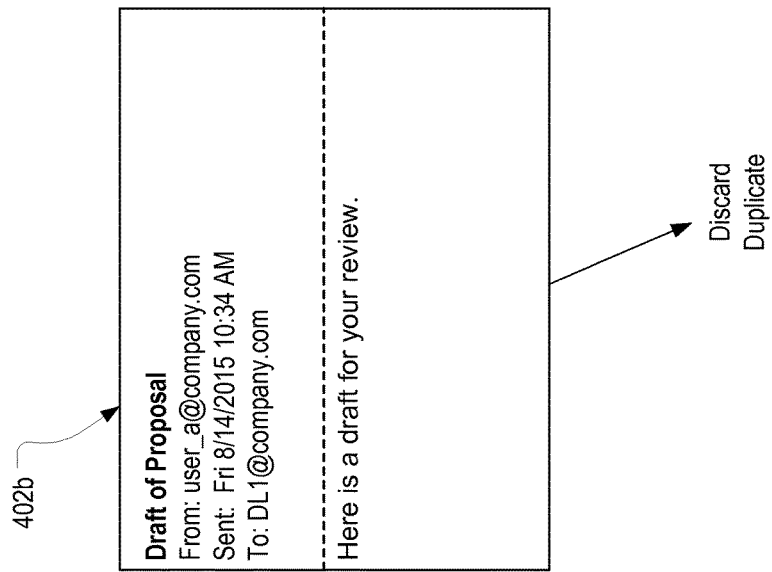

FIG. 5E illustrates how migration engine 301 can discard and optionally reference duplicate emails or other content. In this example, migration engine 301 is processing an email 402b from within User A's mailbox on source system 302. It is assumed that this processing occurs after the processing of User B's mailbox as described above and that email 402b is a copy of email 403a. Because email 403a and email 403b are copies of the same email, migration engine 301 will have already created the corresponding conversation and communication. In other words, communication 502a represents email 402b. For this reason, migration engine 301 can discard email 402b. Similarly, when migrating User C's mailbox, migration engine 301 could discard the copy of the email that User C received. In this way, multiple copies of an email are converted into single-instanced content within the group. The process of determining whether an email is a duplicate can be performed in a similar manner as described above. For example, migration engine 301 can examine the date, subject, sender, and body of an email and compare it to dates, subjects, senders, and contents of group conversations and communications to determine whether the email is a duplicate. To facilitate comparison of the body of the email, a checksum of the body may be employed.

In some embodiments, migration engine 301 can maintain a log (or index) of all emails that it has identified as being associated with a distribution list and use this log during processing of subsequent emails. For example, the log can contain a listing of the dates, subjects, senders, and bodies (e.g., checksums of the contents of the bodies) of all emails that were identified as being associated with a distribution list. This log can be structured in a manner that facilitates comparison with emails during the migration process. For example, when an email that appears to be associated with a distribution list is processed, the email's subject can be compared to all subjects in the log to quickly determine if the email is likely a communication of a conversation that has already been created in a group. Similarly, the email's date, sender, and contents (or checksum of its contents) could be compared to the date, sender, and contents of corresponding entries in the log to quickly determine if the email is a duplicate.

It is also noted that, in contrast to what is shown in FIGS. 5B-5D, migration engine 301 may be configured to generate multiple communications from a single email. For example, if migration engine 301 processes email 403d prior to processing email 403c or email 403a, migration engine 301 may generate conversation data structure 502 and populate it with communications 502a-502c based only on the information obtained from email 403d. In particular, because the body of email 403d contains the content of email 403a and email 403c, communications 502a and 502b can be generated from the body of email 403d. If such were the case, migration engine 301 would discard email 403a and email 403c once they are processed.

Figure 6:
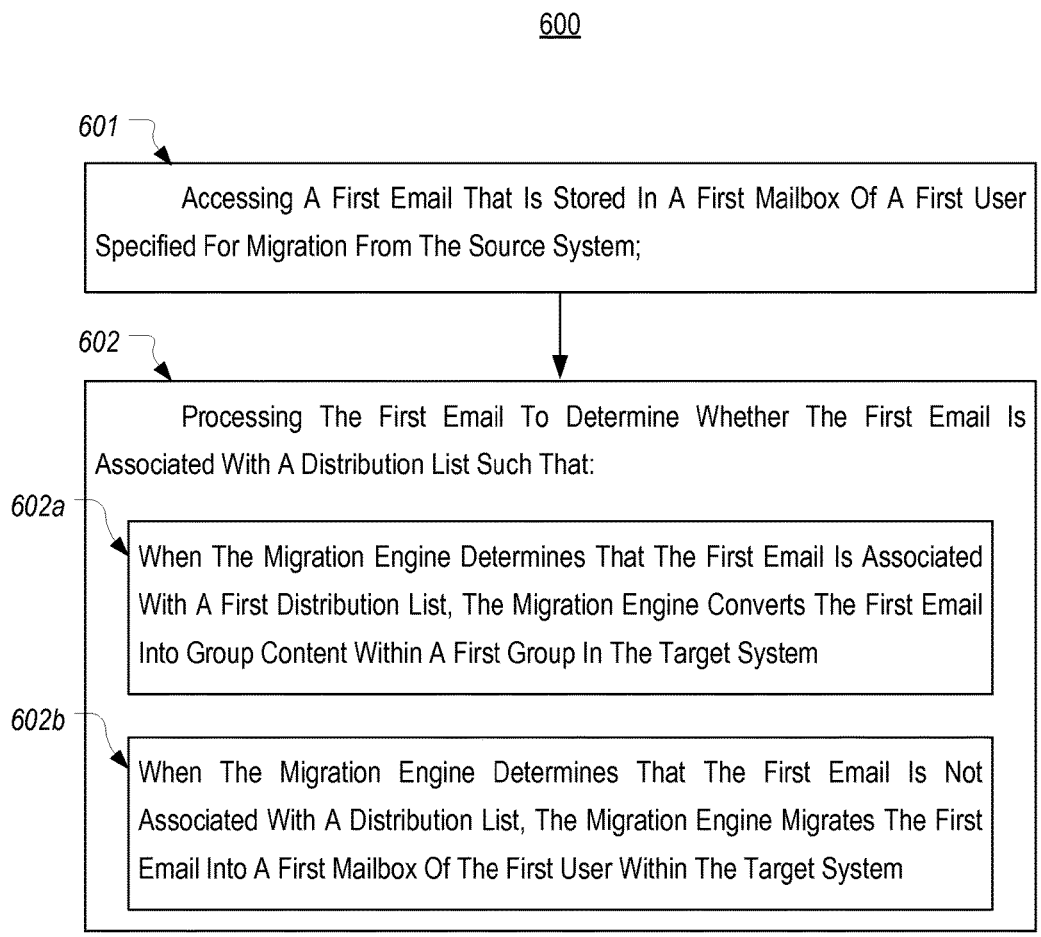
FIG. 6 illustrates a flowchart of a method for processing an email during a migration from a source system to a target system.

FIG. 6 provides a flowchart of an example method 600 for processing email during a migration from a source system to a target system.

Method 600 includes an act 601 of accessing a first email that is stored in a first mailbox of a first user specified for migration from the source system. For example, migration engine 301 can access an email, such as email 403a, 403c, or 403d, within User B's mailbox on source system 302. Similarly, migration engine 301 can access an email, such as email 402b, within User A's mailbox on source system 302.

Method 600 includes an act 602 of processing the first email to determine whether the first email is associated with a distribution list. For example, migration engine 301 can examine the contents of a header (e.g., the "Envelope Recipients" header) in emails 403a, 403c, 403d, 402b, etc., and/or can examine the contents of other fields of these emails and compare the contents to identified objects 401 or other information compiled during the migration.

Method 600 includes an act 602a of converting the first email into group content within a first group in the target system when the migration engine determines that the first email is associated with a first distribution list. For example, email 403a can be converted into communication 502a, email 403c can be converted into communication 502b, or email 403d can be converted into communication 502c.

Method 600 includes an act 602b of migrating the first email into a first mailbox of the first user within the target system when the migration engine determines that the first email is not associated with a distribution list. For example, migration engine 301 can migrate an email that is stored in User B's mailbox on source system 302 and not determined to be associated with a distribution list into User B's mailbox on target system 303.

In summary, the present invention provides a way to convert emails into group content during a migration process. By converting emails associated with distribution lists into group content, all members of the group will obtain/retain access to all group content after the migration. In addition, new members added to the group after the migration will have access to the historical content of the group.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, implemented by a migration engine, for processing emails during a migration from a source system to a target system, the method comprising: accessing, as part of the migration from the source system to the target system, a plurality of emails that are stored in a first mailbox of a first user specified for migration from the source system; processing each of the accessed emails to determine whether the email was sent to a distribution list in the source system; for each of the accessed emails that the migration engine determines was sent to a particular distribution list in the source system, converting the email into group content within a particular group that has been created in the target system and that corresponds with the particular distribution list in the source system such that the group content into which the email is converted is accessible to each member of the particular group in the target system; and for each of the accessed emails that the migration engine determines was sent to a distribution list in the source system, migrating the email into a first mailbox of the first user within the target system.

2. The method of claim 1, wherein the migration engine maintains a listing of distribution lists that are defined on the source system, and wherein determining whether each of the accessed emails was sent to a distribution list in the source system comprises: accessing an identifier of a distribution list within a header of the email; and comparing the identifier of the distribution list to the listing of the distribution lists.

3. The method of claim 2, wherein the migration engine determines that a particular email was sent to a particular distribution list when the particular email includes an email address of the first distribution list in a header that defines recipients of the particular email.

4. The method of claim 1, wherein converting the email into group content within a particular group that has been created in the target system comprises: for a first email of the accessed emails that the migration engine determines was sent to a first distribution list in the source system, extracting, from the first email, a sender of the first email, a date when the first email was sent, and content of the body of the first email; and creating a first communication within a first group that has been created in the target system and that corresponds with the first distribution list, the first communication including the sender, the date, and the content.

5. The method of claim 4, further comprising:
determining that the first email pertains to a first conversation within the first group;
wherein creating the first communication within the first group comprises creating the first communication within the first conversation.

6. The method of claim 5, wherein determining that the first email pertains to a first conversation within the first group comprises:
determining that the first conversation has not been created within the first group; and
creating the first conversation, a name of the first conversation being based on a subject of the first email.

7. The method of claim 5, wherein determining that the first email pertains to a first conversation within the first group comprises one or more of:

comparing a subject of the first email to a name of the first conversation; or comparing contents of the first email to contents of another communication within the first group.

8. The method of claim 5, wherein converting the email into group content within a particular group that has been created in the target system comprises: for a second email of the accessed emails that the migration engine determines was sent to the first distribution list in the source system, converting the second email into group content within the first group in the target system.

9. The method of claim 8, wherein converting the second email into group content within the first group in the target system comprises:

creating a second communication within the first group.

10. The method of claim 9, wherein creating a second communication within the first group comprises:

determining that the second email pertains to the first conversation within the first group;

wherein creating the second communication within the first group comprises creating the second communication within the first conversation.

11. The method of claim 9, wherein creating a second communication within the first group comprises:

determining that the second email pertains to a second conversation within the first group;

wherein creating the second communication within the first group comprises creating the second communication within the second conversation.

12. The method of claim 1, further comprising: for each of the accessed emails that the migration engine determines was sent to a particular distribution list in the source system, creating a placeholder in the first mailbox of the first user within the target system, the placeholder comprising a link to the group content that was created within the particular group.

13. The method of claim 4, further comprising: accessing, as part of the migration from the source system to the target system, a second email that is stored in a second mailbox of a second user within the source system; processing the second email to determine that the second email was sent to a particular distribution list in the source system; comparing the second email to a particular communication that has already been created within a particular group in the target system and that corresponds with the particular distribution list; determining that the second email is a duplicate of an email for which the particular communication was created, and in response, foregoing converting the second email into group content so that a duplicate of the particular communication is not created.

14. A method, performed by a migration engine, for migrating email from a source system to a target system comprising: accessing the source system to identify a number of objects defined within the source system, the objects including a number of users having a mailbox in the source system and one or more distribution lists; for each user, creating a mailbox in the target system; for each distribution list, creating a group in the target system; and for at least one of the mailboxes in the source system, processing each of a plurality of emails in the mailbox by performing the following: determining whether the email was sent to one of the one or more distribution lists; for each email that is determined to have been sent to one of the one or more distribution lists, converting the email into group content within the corresponding group in the target system such that the group content into which the email is converted is accessible to each member of the corresponding group in the target system; and for each email that is determined to not have been sent to one of the one or more distribution lists, migrating the email to the corresponding mailbox in the target system.

15. The method of claim 14, wherein the group content comprises a communication within a group conversation in a particular group, the communication including a sender of a particular email that was determined to have been sent to a particular distribution list for which the particular group was created, a date when the particular email was sent, and content of the body of the particular email.

16. The method of claim 15, wherein the group conversation includes a name that is based on a subject of the particular email.

17. The method of claim 14, wherein converting the email into group content within the corresponding group in the target system comprises:

determining that corresponding group content has already been created for the email; and discarding the email as a duplicate.

18. The method of claim 14, wherein converting the email into group content within the corresponding group in the target system comprises:

creating or identifying a group conversation based on a subject of the email; and creating a communication within the group conversation based on a sender of the email, a date when the email was sent, and content of the body of the email.

19. A migration engine for migrating email comprising: one or more processors; and memory storing computer executable instructions which when executed by the one or more processors perform a method for migrating email from a source system to a target system, the method comprising: accessing the source system to identify a number of users and a number of distribution lists that are defined with the source system; creating, within the target system, a group for each distribution list and a mailbox for each user defined within the source system; accessing, in the source system, a first mailbox for a first user; processing each of a plurality of emails in the first mailbox by: determining whether the email was sent to one of the distribution lists; when the email is determined to have been sent to one of the distribution lists, creating or identifying a conversation within a corresponding group in the target system and creating a communication based on the email within the created or identified conversation such that the group content into which the email is converted is accessible to each member of the corresponding group in the target system; and when the email is determined to not have been sent to one of the distribution lists, migrating the email into a mailbox for the first user on the target system.

20. The migration engine of claim 19, wherein determining whether the email was sent to one of the distribution lists comprises determining whether a header of the email includes an email address of one of the distribution lists.

* * * * *